March 3, 1953   J. H. GEISSE   2,630,285
MULTIPLE WHEEL UNDERCARRIAGE FOR AIRPLANES
Filed Dec. 19, 1950   3 Sheets-Sheet 1

INVENTOR.
John Harlin Geisse

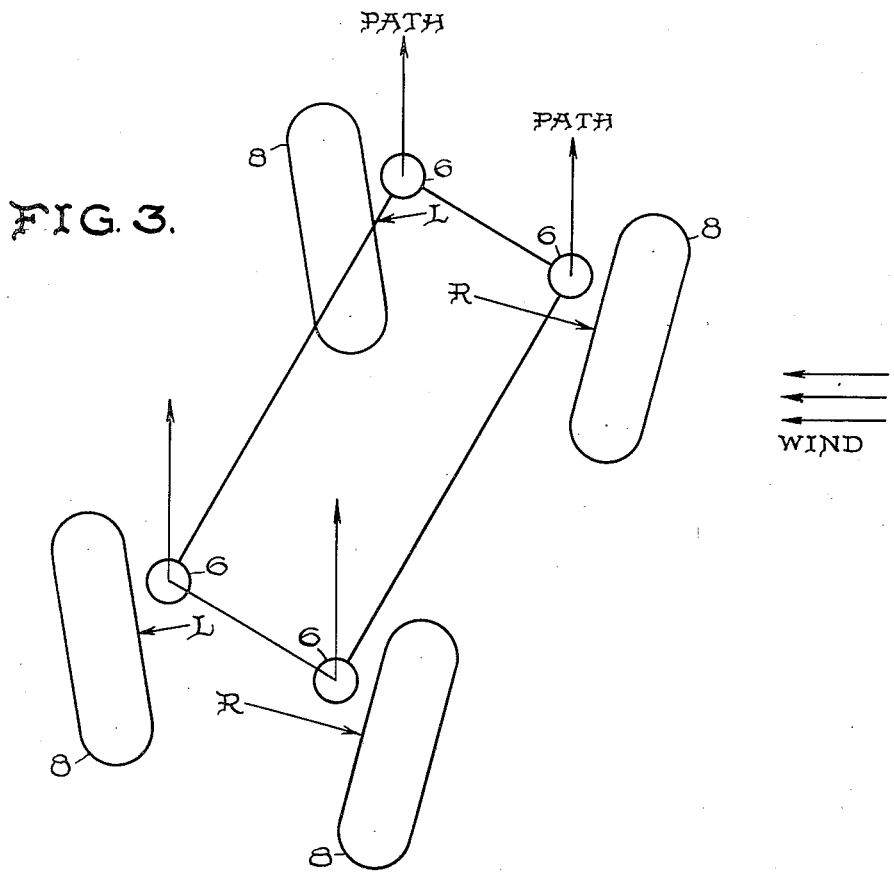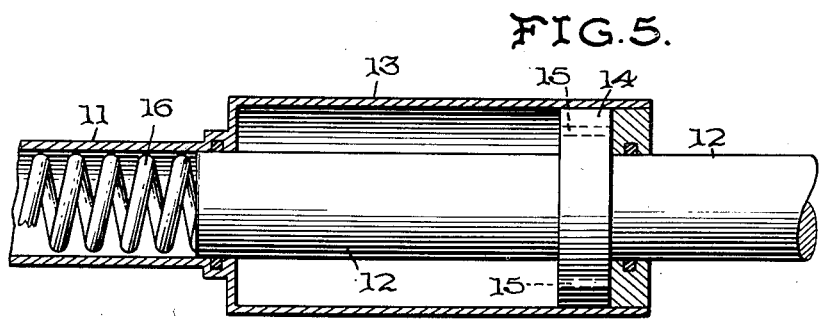

INVENTOR.
John Harlin Geisse

Patented Mar. 3, 1953

2,630,285

UNITED STATES PATENT OFFICE 2,630,285

MULTIPLE WHEEL UNDERCARRIAGE FOR AIRPLANES

John Harlin Geisse, Washington, D. C.

Application December 19, 1950, Serial No. 201,672

3 Claims. (Cl. 244—103)

My invention relates to undercarriages for airplanes in which four or more wheels, spaced both laterally and longitudinally, are attached to one strut and has for its objectives a reduction in undercarriage weight, improved cross wind landing characteristics, and reduction in tire wear.

The increased weight of airplanes has made it desirable to increase the number of wheels carrying this weight in order to reduce the weight carried by each. One method which has been generally used to accomplish this is to attach four wheels to each main strut in a rectangular pattern. Heretofore these wheels and the frame supporting them have been fixed in parallel relationship to the longitudinal axis of the airplane. When so fixed the wheels, the strut to which they are attached, and the airframe are all subjected to high side loads when the airplane is landed in a drift. The structure required to withstand these loads is heavy and the jolt and the roll of the airplane due to these high side loads is disconcerting to the pilot and the passengers.

To the above difficulties, which are common to all fixed wheel mountings, the use of wheels spaced fore and aft on their supporting strut has introduced an additional problem. In the execution of turns on the ground these wheels must skid and skew. This imposes a high torque load on the strut which increases the strength and weight requirements and causes excessive wear of the tires.

I minimize these problems by applying to such undercarriages the type of cross wind undercarriage mechanism described in my Patent Number 2,529,933, dated November 14, 1950.

The application is best described by reference to the accompanying drawings, in which:

Figure 3 is a second plan view showing the relative position of the wheels in a drift landing and Figure 4 is a third plan view showing the positions of the wheel during the execution of a turn on the ground.

Figure 5 is a detail of the collapsible part of the tie rods connecting the wheels.

Figure 1:
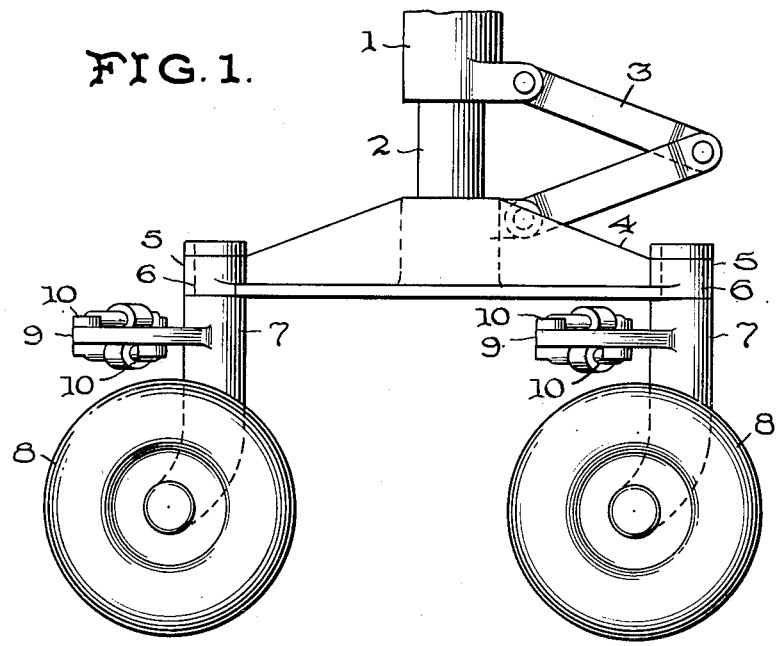
Figure 1 is a side elevation and Figure 2 is a plan view of a typical arrangement of four wheels on one strut with my mechanism added thereto.
Figure 2:
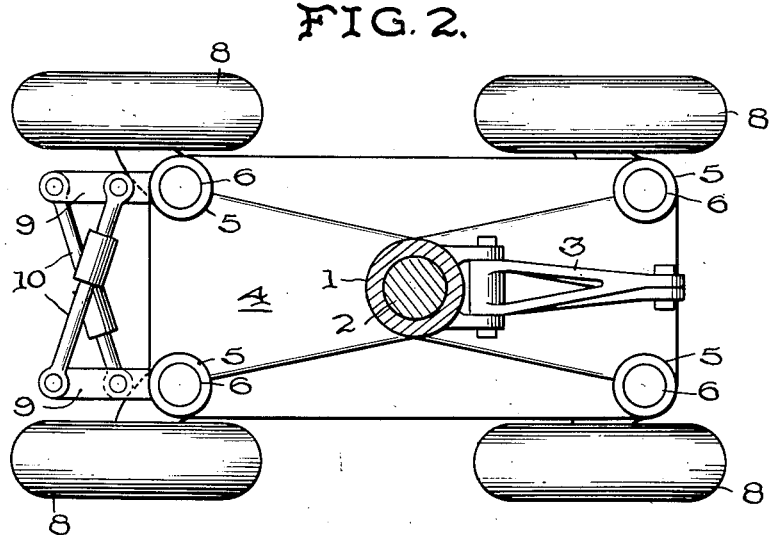

In all figures, 1 is the upper part of a conventional shock strut in which the lower part 2 is reciprocatable. A conventional jackknife element 3 prevents rotation of part 2 in part 1. Attached to the lower end of part 2 is a rectangular frame 4. The frame 4 has spindle bearings 5 attached at its four corners. Rotatably mounted in the spindle bearings 5 are the spindles 6 formed on the upper ends of the wheel forks 7. The wheel forks 7 are curved to provide castering action of the wheels 8.

Extending rearwardly from each wheel fork 7 is an arm 9. The arms 9 of the rear wheels are interconnected by the crossed tie rods 10 which are pivotally attached thereto. The arms 9 of the front wheels are connected together in the same manner.

The tie rods 10 are capable of foreshortening as shown in Figure 5. They are made up of two parts 11 and 12. Part 11 has attached to it the cylinder 13 and part 12 has attached to it the collar or piston 14 which is reciprocatable in cylinder 13.

The tie rods 10 are crossed so that the nosing in of one wheel relative to its frame 4 will constrain the one connected with it to nose out to a greater degree than it has nosed in. Other types of wheel interconnection which would accomplish this relationship between inward and outward castering could be used without departing from the scope of this invention or the appended claims.

Patent No. 2,529,933, previously referred to, discloses that with this form of wheel interconnection the wheels will assume the position shown in Figure 3 and that there will be a side load on the inside of the nosed out wheel as indicated by the vector L in Figure 3 and that a larger side load will be imposed on the nosed in wheel as indicated by the vector R.

The relative magnitudes of the side loads R and L will be determined by the geometry of the wheel interconnections but the resultant of these side loads will always be less than one half of the resultant side load which would prevail under the same degree of drift with fixed wheels.

Figure 4:
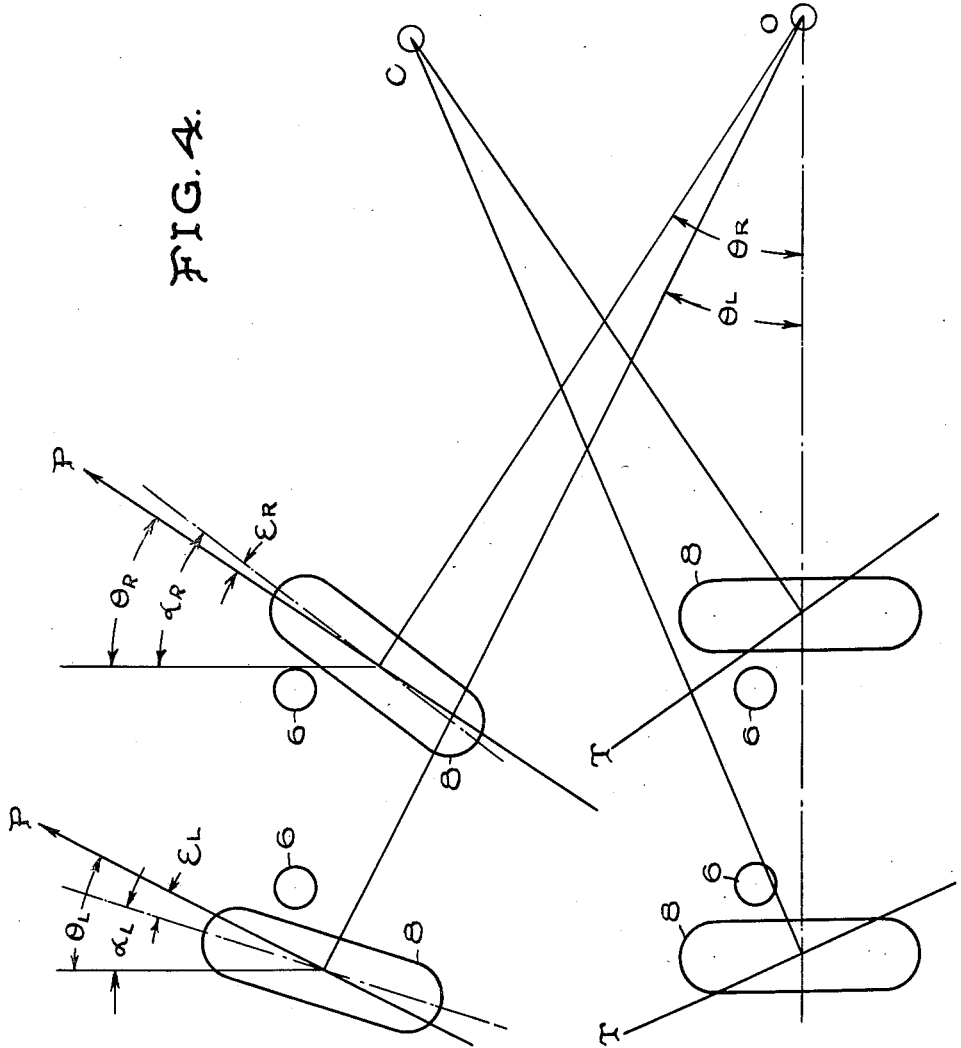

In Figure 4 two assumed centers of path curvature are shown, one C ahead of the rear wheels and the other O in line with the centers of the rear wheels. The lines T are tangents to circles drawn around the center C and passing through the centers of the rear wheels. From these it will be immediately apparent that minimum skewing of the rear wheels in a turn around center C would require that they assume a converging heading. However, if they caster at all my mechanism is such that they would have to assume a diverging heading. Hence, it is evident that any turn around a center ahead of the rear wheels would be accompanied by a considerable skewing of the wheels.

The lines P are tangents to circles drawn around the center O and passing through the centers of the front wheels. Here it will be apparent that minimum skewing would require the wheels to assume a diverging heading which they will do with my mechanism. Hence, the theory of least work will be satisfied only when the airplane turns around a center in line with the rear wheels.

In Figure 4 the angle of castering of the right front wheel in such a turn is designated as $a_R$ and that of the left wheel as $\alpha_L$. The cornering angles, i. e. the angles between the wheel headings and their paths, are designated as $\epsilon_R$ and $\epsilon_L$. The latter are direct measures of the amount of skewing of their respective wheels.

The castering angles $\alpha_R$ and $\alpha_L$ and the cornering angles $\epsilon_R$ and $\epsilon_L$ are determined by the geometry of the wheel connecting linkage but as shown in the patent previously mentioned the ratio of the cornering angles will approximate the reciprocal of the ratio of the castering angles. Assuming the ratios to be $K$ and $1/K$ the values of $\epsilon_R$ and $\epsilon_L$ can be determined as follows:

$$\epsilon_L = \theta_L - \alpha_L$$
$$\epsilon_R = \alpha_R - \theta_R$$
$$\alpha_R = K\alpha_L$$
$$\epsilon_R = 1/K\ \epsilon_L$$
$$\theta_L - \alpha_L = K(\alpha_R - \theta_R)$$
$$= K(K\alpha_L - \theta_R)$$
$$\alpha_L = \frac{\theta_L + K\theta_R}{K^2 + 1}$$
$$\epsilon_L = \frac{K}{K^2 + 1}(K\theta_L - \theta_R)$$
$$\epsilon_R = \frac{1}{K^2 + 1}(K\theta_L - \theta_R)$$

It is apparent from the last equations and from Figure 4 that the skewing will be reduced to zero when $\theta_R$ equals $K\theta_L$ and that $\theta_R$ will approach this equality as the radius of turn decreases. At larger radii $\theta_R$ will approach equality with $\theta_L$ and the sum of the cornering angles $\epsilon_R$ and $\epsilon_L$ will approach $$\frac{K^2 - 1}{K^2 + 1}\theta$$

For fixed wheels the corresponding sum of the cornering angles $\epsilon_R$ and $\epsilon_L$ would be equal to $2\theta$. Hence, the reduction in tire skewing in a turn on the ground accomplished by my mechanism would range from 100 per cent elimination to a reduction of over 50 per cent.

The reduction in torque on the strut would be substantially greater than the reduction in skewing. Whereas in calculating the total skewing the values of $\epsilon_R$ and $\epsilon_L$ are added, in the calculation of the torque they would be substractive since the moment of the side load of the right hand wheel around the strut center would be in the opposite direction to the moment of the side load of the left hand wheel.

In the castering of wheels shimmy is an ever present problem and in Figure 5 I have shown one simple method of dampening shimmy with the particular mechanism used to illustrate my invention. When the wheels caster one of the tie rods 10 must foreshorten and the collar or piston 14 will reciprocate in the cylinder 13. Filling this cylinder with a suitable liquid and providing restricted passages 15 from one side of the piston 14 to the other side will provide a conventional hydraulic shimmy damper.

In most cases it is also desirable to provide some means of returning the wheels to their straight ahead position after they have left the ground. This could be accomplished readily by placing a spring 16 in the member 11 and providing an extension to member 12 which would compress it when the tie rod 10 foreshortens.

A distinct advantage of my construction is that the mechanism which reduces the torque on the strut during turns on the ground is at the same time the mechanism which provides the needed caster restraint in cross wind landings. Any other form of caster restraint, such as springs and cams, would oppose the castering of the wheels in a turn on the ground with the same strength as they oppose castering during a drift landing.

My construction would have distinct advantages when used on airplanes having the so-called bicycle type of undercarriage in which the entire weight of the airplane is supported on wheels placed under the longitudinal axis of the airplane in fore and aft positions. In such airplanes it is all the more desirable to use additional wheels to distribute the weight and to caster the main wheels in order to reduce the loading of the auxilliary outboard wheels.

Having thus described my invention, I claim:

1. An undercarriage element for aircraft comprising a frame adapted to be attached to the aircraft for the ground support thereof, multiple ground engaging wheels casterably mounted on said frame, said wheels being arranged in longitudinally spaced pairs, the wheels of each pair being spaced laterally, and linkage connected between the wheels of each pair constraining them to caster in the same direction, said linkage simultaneously constraining one of said wheels to toe out through a greater angle than the other toes in.

2. A ground engaging element for aircraft comprising a telescopic shock strut, a frame attached to the lower end of said strut, laterally spaced ground engaging wheels casterably mounted on said frame to the rear of the centerline of said strut, other laterally spaced ground engaging wheels casterably mounted on said frame to the front of the centerline of said strut, linkage connected between the wheels mounted to the rear of said strut, and other linkage connected between the wheels mounted to the front of said strut, said linkages constraining the wheels to which they are attached to caster in the same direction but in different amounts such that they toe out more than they toe in.

3. An airplane undercarriage element including a frame adapted to be attached to the air frame, multiple ground engaging wheels casterably mounted on said frame and disposed laterally and longitudinally with respect to each other and linkages connected between each of said wheels and its laterally spaced counterpart, said linkages constraining the wheels to which they are attached to assume diverging headings relative to each other when they are castered away from their straight ahead position.

JOHN HARLIN GEISSE.

REFERENCES CITED

The following references are of record in the file of this patent:

UNITED STATES PATENTS

| Number | Name | Date |
|---|---|---|
| 2,029,540 | Porteous | Feb. 4, 1936 |
| 2,346,667 | Dowty | Apr. 18, 1944 |
| 2,502,522 | Hoobler | Apr. 4, 1950 |
| 2,529,933 | Geisse | Nov. 14, 1950 |
| 2,538,388 | Sievers | Jan. 16, 1951 |
| 2,567,074 | Kupiec | Sept. 4, 1951 |

FOREIGN PATENTS

| Number | Country | Date |
|---|---|---|
| 267,070 | Germany | June 6, 1912 |